United States Patent
Billhartz

(10) Patent No.: US 7,082,117 B2
(45) Date of Patent: *Jul. 25, 2006

(54) MOBILE AD-HOC NETWORK WITH INTRUSION DETECTION FEATURES AND RELATED METHODS

(75) Inventor: Thomas Jay Billhartz, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 765 days.

This patent is subject to a terminal disclaimer.

(21) Appl. No.: 10/217,097

(22) Filed: Aug. 12, 2002

(65) Prior Publication Data

US 2004/0028000 A1 Feb. 12, 2004

(51) Int. Cl.
*H04Q 7/24* (2006.01)

(52) U.S. Cl. ............................ 370/338; 726/23; 709/24

(58) Field of Classification Search ................ 370/252, 370/254, 240, 389, 351, 352, 401; 709/223, 709/224; 713/164, 187; 726/1–23
See application file for complete search history.

(56) References Cited

U.S. PATENT DOCUMENTS

| | | | |
|---|---|---|---|
| 5,412,654 A | 5/1995 | Perkins | 370/94.1 |
| 5,978,669 A | 11/1999 | Sanmugam | 455/410 |
| 6,047,330 A | 4/2000 | Stracke, Jr. | 709/238 |
| 6,160,804 A | 12/2000 | Ahmed et al. | 370/349 |
| 6,304,556 B1 | 10/2001 | Haas | 370/254 |
| 6,791,996 B1 * | 9/2004 | Watanabe et al. | 370/447 |
| 6,914,890 B1 * | 7/2005 | Tobita et al. | 370/338 |
| 6,934,752 B1 * | 8/2005 | Gubbi | 709/225 |
| 6,950,946 B1 * | 9/2005 | Droz et al. | 340/5.74 |
| 7,027,462 B1 * | 4/2006 | Benveniste | 370/447 |

OTHER PUBLICATIONS

Kozup, *Secure Your WLAN Now, ZDNet Tech Update*, Nov. 13, 2001, avaliable at http://techupdate.zdnet.com/techupdate/stories/main/0,14179,2835133,00.html.

Vamosi, *Go Away! How to Keep Hackers Out of Your Wireless Network*, CNET/ZDNet Reviews, Mar. 27, 2002, available at http://www.zdnet.com/anchordesk/stories/story/0,10738,2858228,00.html.

*Wireless LAN Security 802.11b and Corporate Networks*, Internet Security Systems, 2001, available at http://www.iss.net/support/documentation/whitepapers/iss.php.

(Continued)

*Primary Examiner*—Chi Pham
*Assistant Examiner*—Phuc Tran
(74) *Attorney, Agent, or Firm*—Allen, Dyer, Doppelt, Milbrath & Gilchrist, P.A.

(57) ABSTRACT

A mobile ad-hoc network (MANET) may include a plurality of nodes for transmitting data therebetween using a media access layer (MAC), where each of the nodes has a respective MAC address associated therewith. The MANET may also include a policing node for detecting intrusions into the MANET by monitoring transmissions among the plurality of nodes to detect frame check sequence (FCS) errors from a MAC address, and generating an intrusion alert based upon detecting a number of FCS errors for the MAC address exceeding a threshold. The policing node may also detect intrusions based upon one or more of failed MAC address authentications, illegal network allocation vector (NAV) values, and unexpected contention or contention-free operation.

62 Claims, 11 Drawing Sheets

OTHER PUBLICATIONS

Blackwell, *Serious WLAN Security Threats: Part II*, INT Media Group, Inc., 2002, available at http://www.80211-planet.com/columns/article/0,,1781_947571,00.html.

*Accessing Wireless Security with Airopeek*, WildPackets, Inc., 2001, available at http://www.wildpackets.com/products/airopeek/white_papers.

*WildPackets' Guide to Wireless LAN Analysis*, WildPackets, Inc., 2001, available at http://www.wildpackets.com/support/white_papers.

Zhang et al., *Intrusion Detection In Wireless Ad-Hoc Networks*, ACM MOBICOM, 2000.

Albers et al., *Security in Ad Hoc Networks: a General Intrusion Detection Architecture Enhancing Trust Based Approaches*, Proceedings of the International First Workshop on Wireless Information Systems (Wis-2002), Apr. 2002.

* cited by examiner

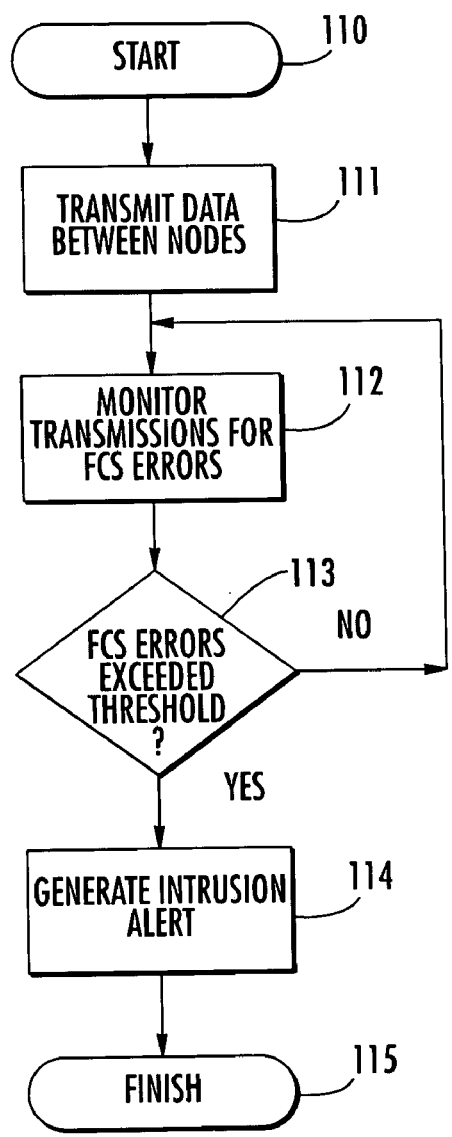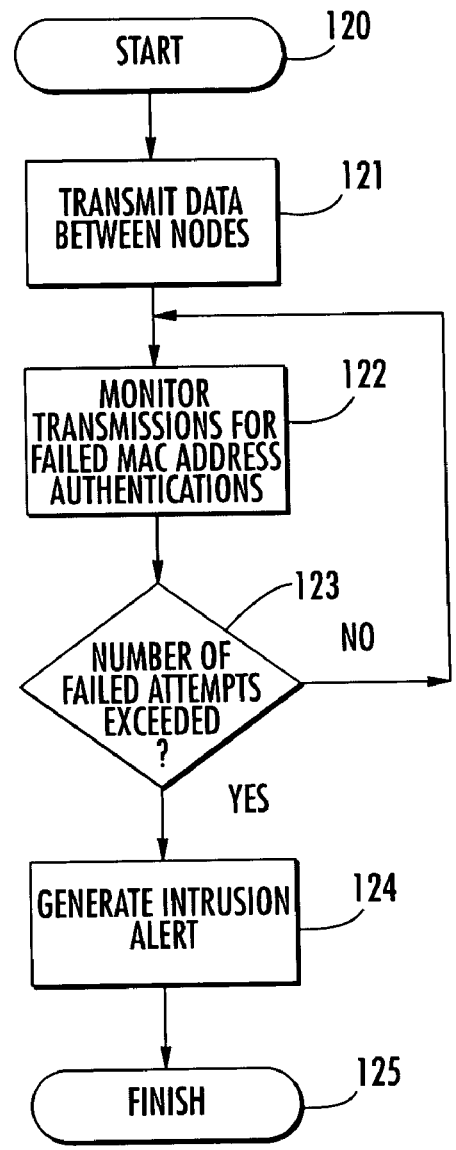
FIG. 11.
FIG. 12.

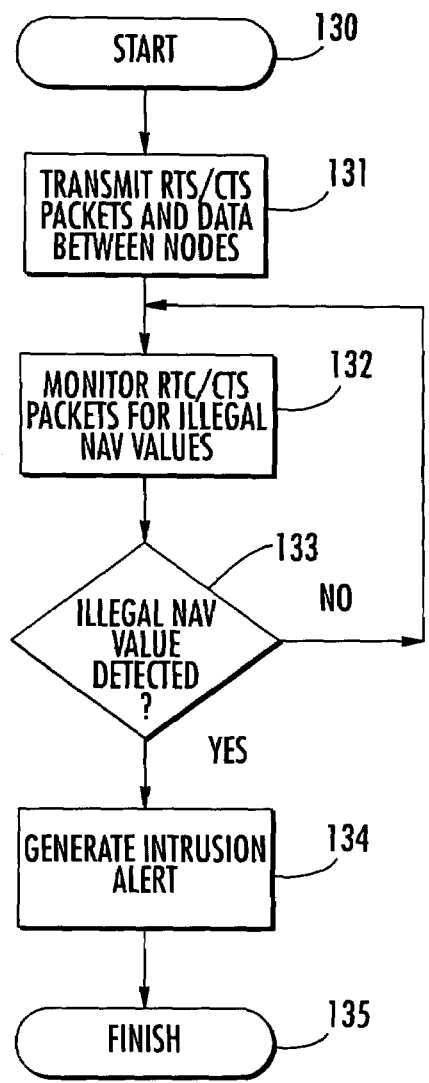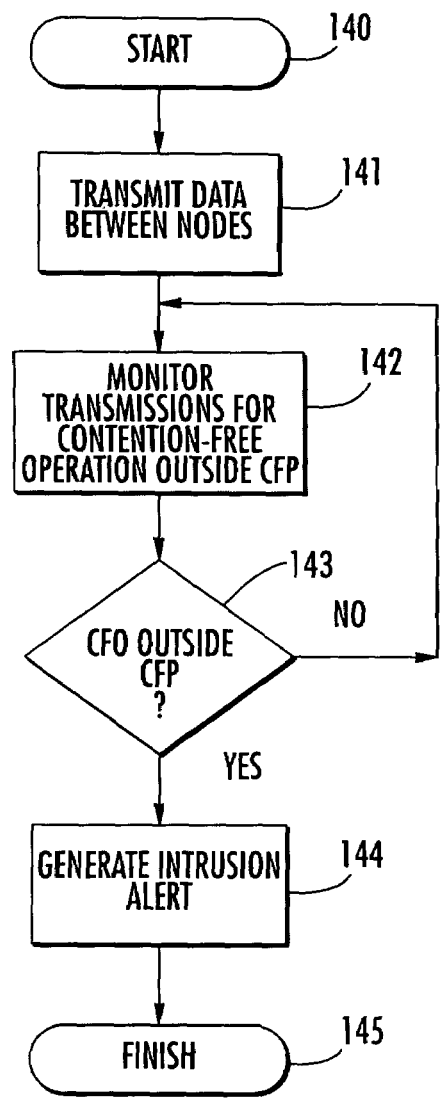
FIG. 13.
FIG. 14.

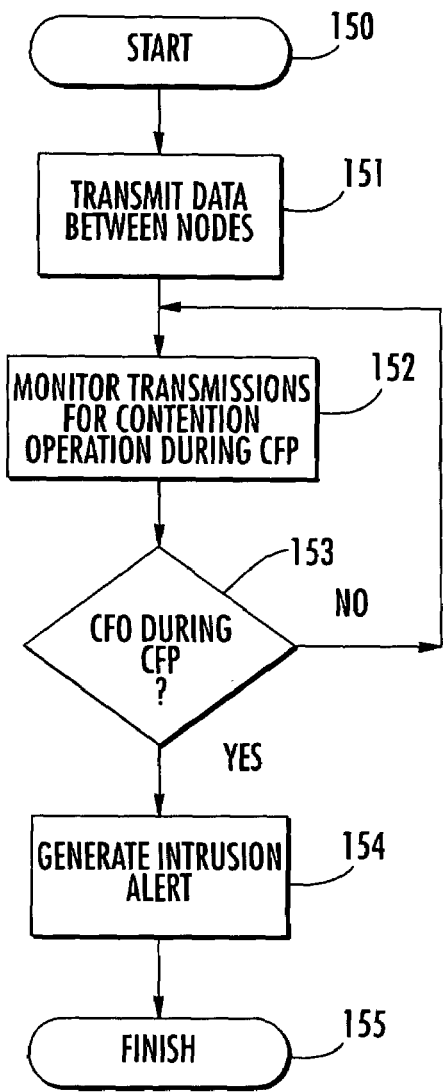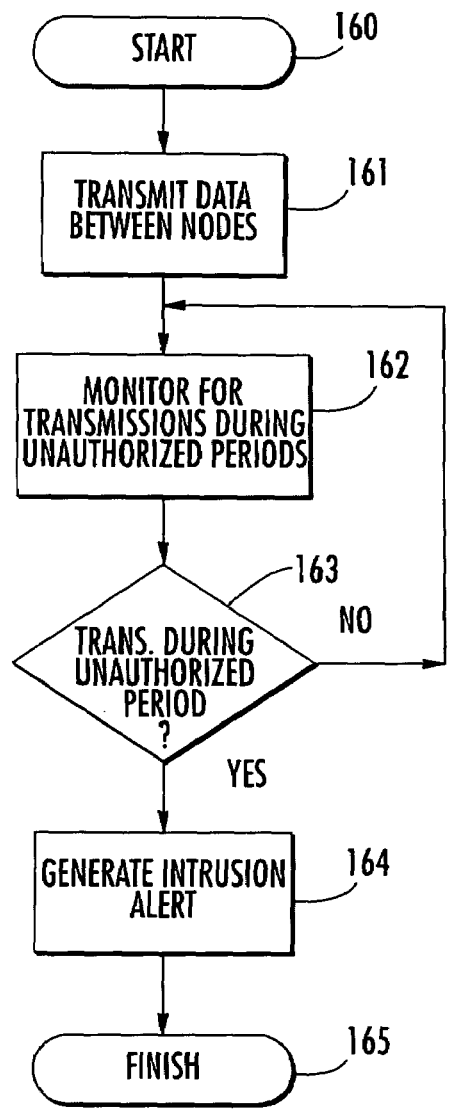
FIG. 15.
FIG. 16.

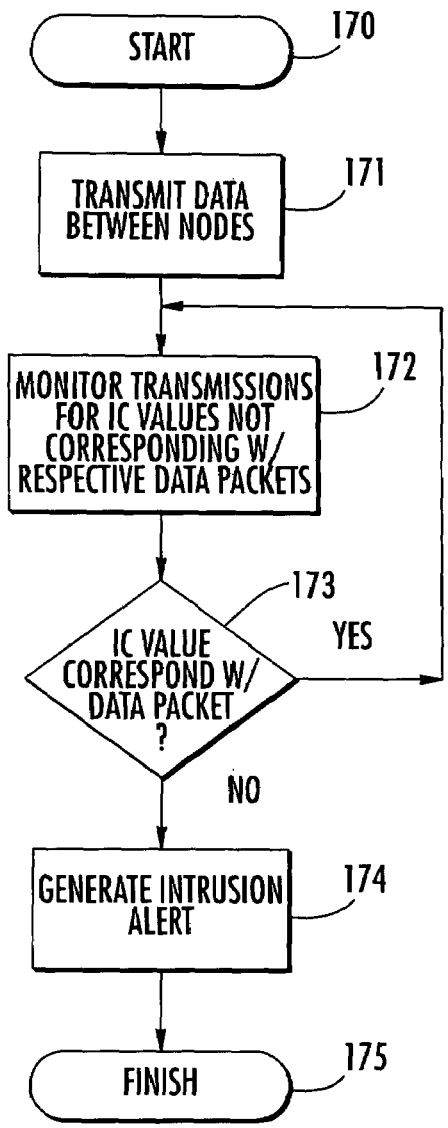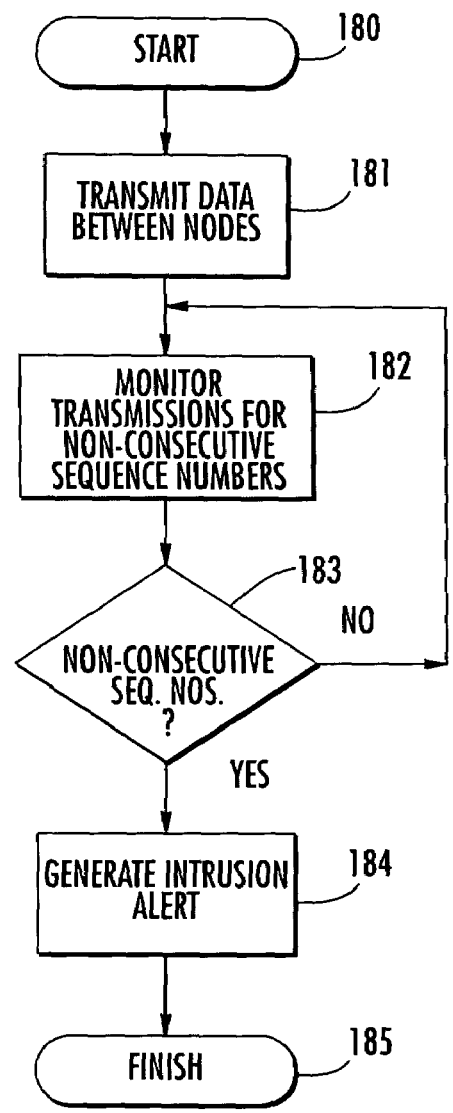
FIG. 17.
FIG. 18.

MOBILE AD-HOC NETWORK WITH INTRUSION DETECTION FEATURES AND RELATED METHODS

FIELD OF THE INVENTION

The present invention relates to the field of wireless networks, and, more particularly, to mobile ad-hoc networks and related methods.

BACKGROUND OF THE INVENTION

Wireless networks have experienced increased development in the past decade. One of the most rapidly developing areas is mobile ad-hoc networks, or MANETs for short. Physically, a mobile ad-hoc network includes a number of geographically-distributed, potentially mobile nodes sharing a common radio channel. Compared with other types of networks, such as cellular networks or satellite networks, the most distinctive feature of mobile ad-hoc networks is the lack of any fixed infrastructure. The network may be formed of mobile nodes only, and a network is created "on the fly" as the nodes come close enough to transmit with each other. The network does not depend on a particular node and dynamically adjusts as some nodes join or others leave the network.

Because of these unique characteristics, routing protocols for governing data flow within ad-hoc networks are required which can adapt to frequent topology changes. Two basic categories of ad-hoc routing protocols have emerged in recent years, namely reactive or "on-demand" protocols, and proactive or table-driven protocols. Reactive protocols collect routing information when a particular route is required to a destination in response to a route request. Examples of reactive protocols include ad-hoc on demand distance vector (AODV) routing, dynamic source routing (DSR), and the temporally ordered routing algorithm (TORA).

On the other hand, proactive routing protocols attempt to maintain consistent, up-to-date routing information from each node to every other node in the network. Such protocols typically require each node to maintain one or more tables to store routing information, and they respond to changes in network topology by propagating updates throughout the network to maintain a consistent view of the network. Examples of such proactive routing protocols include destination-sequenced distance-vector (DSDV) routing, which is disclosed in U.S. Pat. No. 5,412,654 to Perkins; the wireless routing protocol (WRP); and cluster-head gateway switch routing (CGSR). A hybrid protocol which uses both proactive and reactive approaches is the zone routing protocol (ZRP), which is disclosed in U.S. Pat. No. 6,304,556 to Haas.

One challenge to the advancement of ad-hoc network development is that of security. More particularly, since nodes in a mobile ad-hoc network all communicate wirelessly, there is a much greater risk of intrusion by unauthorized users. Because of the early stage of development of ad-hoc networks and the numerous other challenges these networks present, the above routing protocols have heretofore primarily focused solely on the mechanics of data routing and not on intrusion detection.

Some approaches are now being developed for providing intrusion detection in mobile ad-hoc networks. One such approach is outlined in an article by Zhang et al. entitled "Intrusion Detection in Wireless Ad-Hoc Networks," ACM MOBICOM, 2000. In this article, an intrusion detection architecture is proposed in which every node in the MANET participates in intrusion detection and response. That is, each node is responsible for detecting signs of intrusion locally and independently, but neighboring nodes can collaboratively investigate in a broader range. Moreover, intrusion detection is based upon anomaly detections, such as the detection of abnormal updates to routing tables or anomalies in certain network layers, such as with media access control (MAC) layer protocols. Another similar MANET intrusion detection architecture is disclosed in "Security in Ad Hoc Networks: a General Intrusion Detection Architecture Enhancing Trust Based Approaches," by Albers et al., in Proceedings of the International First Workshop on Wireless Information Systems (Wis-2002), April 2002.

While the architectures discussed in the above articles may provide a convenient starting point for implementing intrusion detection, much of the details regarding the implementation of intrusion detection in MANETs have yet to be determined. That is, the particular types of node characteristics which can reliably indicate whether a node is a rouge node attempting to intrude upon the network still remain largely undefined.

SUMMARY OF THE INVENTION

In view of the foregoing background, it is therefore an object of the present invention to provide a mobile ad-hoc network (MANET) with intrusion detection features and related methods.

This and other objects, features, and advantages in accordance with the present invention are provided by a MANET which may include a plurality of nodes for transmitting data therebetween using a media access (MAC) layer, where each of the nodes has a respective MAC address associated therewith. The MANET may also include a policing node for detecting intrusions into the network. This may be done by monitoring transmissions among the plurality of nodes to detect frame check sequence (FCS) errors from a MAC address, and generating an intrusion alert based upon detecting a number of FCS errors for the MAC address exceeding a threshold.

Furthermore, the policing node may detect intrusions into the wireless network by monitoring transmissions among the plurality of nodes to detect failed attempts to authenticate MAC addresses, and generating an intrusion alert based upon detecting a number of failed attempts to authenticate a MAC address. More specifically, the policing node may generate an intrusion alert based upon detecting the number of failed attempts to authenticate a MAC address within a predetermined period.

In addition, the plurality of nodes may transmit request to send (RTS) and clear to send (CTS) packets therebetween prior to transmitting data. The RTS and CTS packets may include a network allocation vector (NAV) indicating a time duration reserved for transmitting the data. As such, the policing node may further detect intrusions into the MANET by monitoring the RTS and CTS packets sent between the plurality of nodes to detect an illegal NAV value therein and generate an intrusion alert based thereon.

The plurality of nodes may also intermittently operate in a contention-free mode during a contention-free period (CFP). Thus, the policing node may also advantageously detect intrusions into the wireless network by monitoring transmissions among the plurality of nodes to detect contention-free mode operation outside of a CFP (or vice versa) and generate an intrusion alert based thereon.

Additionally, the MANET may have at least one service set ID associated therewith. Accordingly, the policing node may further detect intrusions into the MANET by monitoring transmissions among the plurality of nodes to detect service set IDs associated therewith. The policing node may further generate an intrusion alert based upon one of the detected service set IDs being different than the at least one service set ID of the MANET. Also, the plurality of nodes may transmit data over at least one channel, and the policing node may detect transmissions over the at least one channel not originating from one of the plurality of nodes and generate an intrusion alert based thereon.

The policing node may advantageously transmit an intrusion alert to at least one of the plurality of nodes in some embodiments. As such, the appropriate countermeasures may be taken to respond to the intrusion.

An intrusion detection method aspect of the invention is for a MANET including a plurality of nodes. The method may include transmitting data between the plurality of nodes using a MAC layer, where each of the nodes has a respective MAC address associated therewith. Moreover, transmissions among the plurality of nodes may be monitored to detect FCS errors from a MAC address, and an intrusion alert generated based upon detecting a number of FCS errors for the MAC address exceeding a threshold.

Additionally, the method may also include monitoring transmissions among the plurality of nodes to detect failed attempts to authenticate MAC addresses, and generating an intrusion alert based upon detecting a number of failed attempts to authenticate a MAC address. In particular, an intrusion alert may be generated based upon detecting a number of failed attempts to authenticate a MAC address within a predetermined period.

Furthermore, the method may include transmitting RTS and CTS packets between the plurality of nodes prior to transmitting data. As noted above, the RTS and CTS packets typically include NAV values indicating a time duration reserved for transmitting the data. Moreover, the RTS and CTS packets transmitted between the plurality of nodes may be monitored to detect an illegal NAV value therein, and an intrusion alert generated based upon the detected illegal NAV value.

The plurality of nodes may intermittently operate in a contention-free mode during a CFP. As such, the method may also include monitoring transmissions among the plurality of nodes to detect contention-free mode operation outside of a CFP (or vice versa), and generating an intrusion alert based thereon.

In addition, the MANET may have at least one service set ID associated therewith. Thus, the method may further include monitoring transmissions among the plurality of nodes to detect service set IDs associated therewith, and generating an intrusion alert based upon one of the detected service set IDs being different than the at least one service set ID of the wireless network. Also, the plurality of nodes may transmit data over at least one channel. Transmissions over the at least one channel not originating from one of the plurality of nodes may therefore be detected, and an intrusion alert generated based thereon. The method may also include transmitting the intrusion alert to at least one of the plurality of nodes.

BRIEF DESCRIPTION OF THE DRAWINGS

FIG. 11 is a flow diagram illustrating an intrusion detection method in accordance with the present invention based upon detecting FCS errors.

FIG. 12 is a flow diagram illustrating an intrusion detection method in accordance with the present invention based upon detecting failed authentications of MAC addresses.

FIG. 13 is a flow diagram illustrating an intrusion detection method in accordance with the present invention based upon detecting illegal network allocation vector (NAV) values.

FIGS. 14 and 15 are flow diagrams illustrating intrusion detection methods in accordance with the present invention based upon detecting contention-free mode operation outside of a CFP and detecting contention mode operation during a CFP, respectively.

FIG. 16 is a flow diagram illustrating an intrusion detection method in accordance with the present invention based upon detecting transmissions occurring during an unauthorized period.

FIG. 17 is a flow diagram illustrating an intrusion detection method in accordance with the present invention based upon detecting integrity check values which do not correspond with their respective data packets.

FIG. 18 is a flow diagram illustrating an intrusion detection method in accordance with the present invention based upon detecting usage of non-consecutive MAC sequence numbers by a node.

DETAILED DESCRIPTION OF THE PREFERRED EMBODIMENTS

Figure 1:
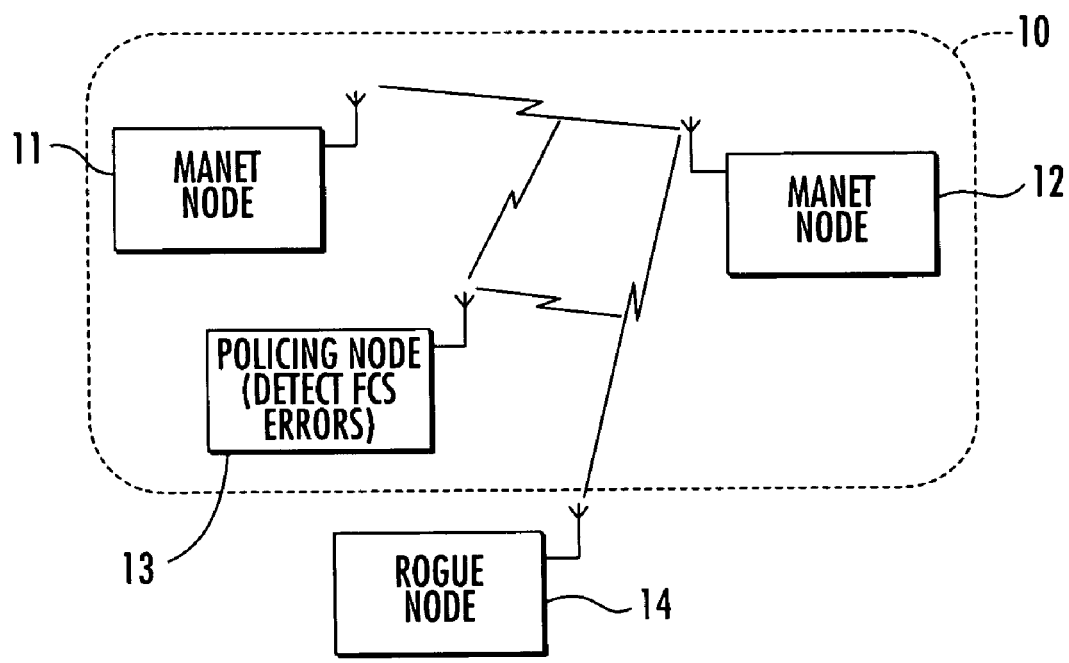
FIG. 1 is a schematic block diagram of a MANET in accordance with the present invention for providing intrusion detection based upon frame check sequence (FCS) errors.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

For purposes of the foregoing discussion, like numbers refer to like elements throughout. Moreover, referring particularly to FIGS. 1–10, reference numerals differing by decades are used to indicate similar elements in alternate embodiments. For example, the mobile ad-hoc network (MANET) nodes 11, 21, 31, 41, 51, 61, 71, 81, 91, and 101 illustrated in FIGS. 1–10 are all similar elements, and so on. As such, these elements may only be described in detail upon their first occurrence to avoid undue repetition, but later occurring elements are understood to be similar to those first described.

Referring now to FIG. 1, a MANET 10 in accordance with the present invention illustratively includes nodes 11, 12. While only the two nodes 11, 12 are shown for clarity of illustration, those of skill in the art will appreciate that any number of nodes may be included within the MANET 10. Such nodes may be laptop computers, personal data assistants (PDAs), cellular telephones, or other suitable devices, as will be appreciated by those of skill in the art. Further, in some embodiments one or more nodes in the MANET 10 may be fixed to provide a bridge to a wired (or satellite) communications infrastructure, such as a telephone network, for example.

Before describing the MANET 10 in further detail, a brief discussion regarding MANET protocols in general is warranted. While MANETs are still in their infancy and there is as yet no one common standard governing communications in such networks, one likely characteristic of MANETs is that MANET nodes will operate in accordance with the open system architecture (OSI) model for data transfer, which includes seven layers at which certain types of data are sent using various protocols. These layers include the application layer, presentation layer, session layer, transport layer, network layer, data link layer, and physical layer.

The data link layer further includes media access control (MAC) and logical link control sub-layers. In accordance with the invention, the nodes 11, 12 preferably use the MAC layer for transmitting data therebetween, and each has a respective MAC addresses associated therewith, as will be appreciated by those of skill in the art. Of course, the remaining layers of the OSI model may also be used for data transmission as well, and other suitable network data transfer models may also be used. Moreover, such data is typically sent in packets, and various packets types are used for different types of message data, as will be described further below.

In accordance with the invention, the MANET 10 illustratively includes one or more policing nodes 13 for detecting intrusions into the network by a rogue node 14. By way of example, the rogue node 14 may be used by a would-be hacker attempting to hack into the MANET 10, or it may simply be a node from a different MANET that is operating too closely to the MANET 10. In the present example, the policing node 13 monitors transmissions among the nodes 11, 12 to detect frame check sequence (FCS) errors from a given MAC address. If a number of FCS errors detected for a given MAC address exceeds a threshold, the policing node 13 generates an intrusion alert based thereon.

It should be noted that, as used herein, the phrase "transmissions among the nodes" is intended to mean any transmission directly to or from one of the nodes 11, 12, as well as any transmission within an operating range of the MANET 10. In other words, the policing node 13 may monitor transmissions directed to or originating from the nodes 11, 12 as well as any other transmissions it may receive whether or not they are specifically directed to or originate from a node in the MANET 10.

In the above-described embodiment (and those described below), the policing node 13 may advantageously transmit the alert to one or more of the nodes 11, 12 in the MANET 10. By way of example, the policing node 13 may transmit the intrusion alert directly to the node 12, which may then notify all of the remaining nodes in the wireless network. Alternately, the policing node 13 may broadcast the intrusion alert to all network nodes. In either case, the appropriate countermeasures may then be taken to respond to the unauthorized intrusion, as will be appreciated by those skilled in the art. Such countermeasures are beyond the scope of the present invention and will therefore not be discussed herein.

Figure 2:
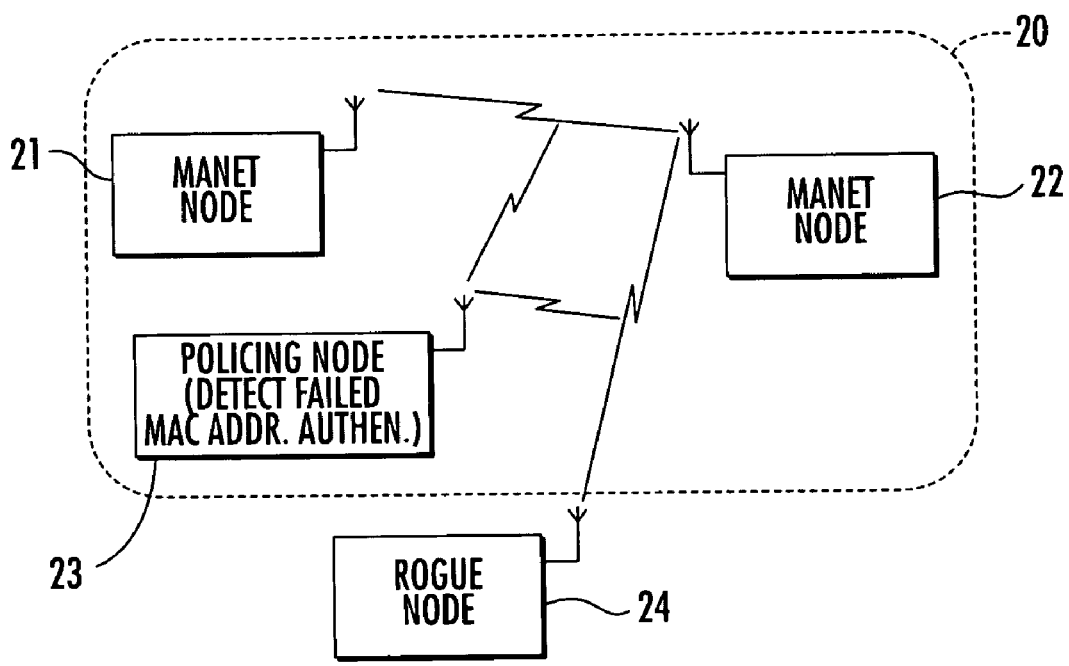
FIG. 2 is a schematic block diagram of an alternate embodiment of the MANET of FIG. 1 for providing intrusion detection based upon failed authentications of media access control (MAC) addresses.

Turning now to FIG. 2, a first alternate embodiment of the MANET 20 is now described. In this embodiment, the policing node 23 detects intrusions into the wireless network 20 by monitoring transmissions among the nodes 21, 22 to detect failed attempts to authenticate MAC addresses. Upon detecting a certain predetermined number of failed attempts to authenticate a particular MAC address, the policing node 23 will generate an intrusion alert.

Any number of failed attempts may be used as the threshold for generating the intrusion alert, but it may generally be desirable to allow a node at least one attempt to authenticate its MAC address without generating the intrusion alert. Moreover, in some embodiments the policing node 23 may advantageously only generate the intrusion alert if the detected number of failures occur within a predetermined period (e.g., an hour, day, etc.).

Figure 3:
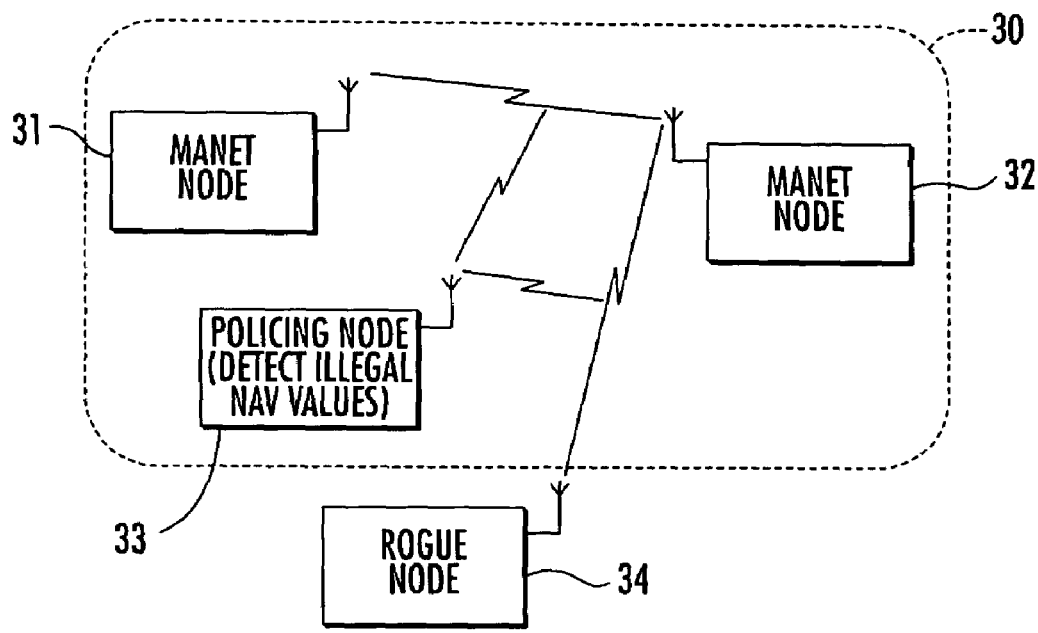
FIG. 3 is a schematic block diagram of another alternate embodiment of the MANET of FIG. 1 for providing intrusion detection based upon illegal network allocation vectors (NAVs).

Turning now additionally to FIG. 3, in accordance with another aspect of the invention the two nodes 31, 32 of the MANET 30 transmit request to send (RTS) and clear to send (CTS) packets therebetween prior to transmitting data. The reason for this is to avoid collisions with other transmissions. That is, since many or all of the remaining nodes in the MANET 30 may be communicating on the same channel, these nodes may need to ensure that they are not transmitting at the same time, as this could result in interference and network disruption.

Also, the RTS and CTS packets preferably include a network allocation vector (NAV) indicating a time duration reserved for transmitting the data. This information is transmitted to adjacent nodes in the MANET 30, which will then stop transmission during the specified period, for example.

Accordingly, the policing node 33 may therefore detect intrusions into the wireless network 30 by monitoring RTS and CTS packets sent between the nodes 31, 32 to detect an illegal NAV value therein. For example, the MANET 30 may be implemented in such a way that data transmission may not exceed a certain amount of time, which will be known to all of the authorized nodes participating therein. Thus, if the policing node 33 detects a NAV value outside of the allotted amount of time, it will then generate an intrusion alert based thereon.

Figure 4:
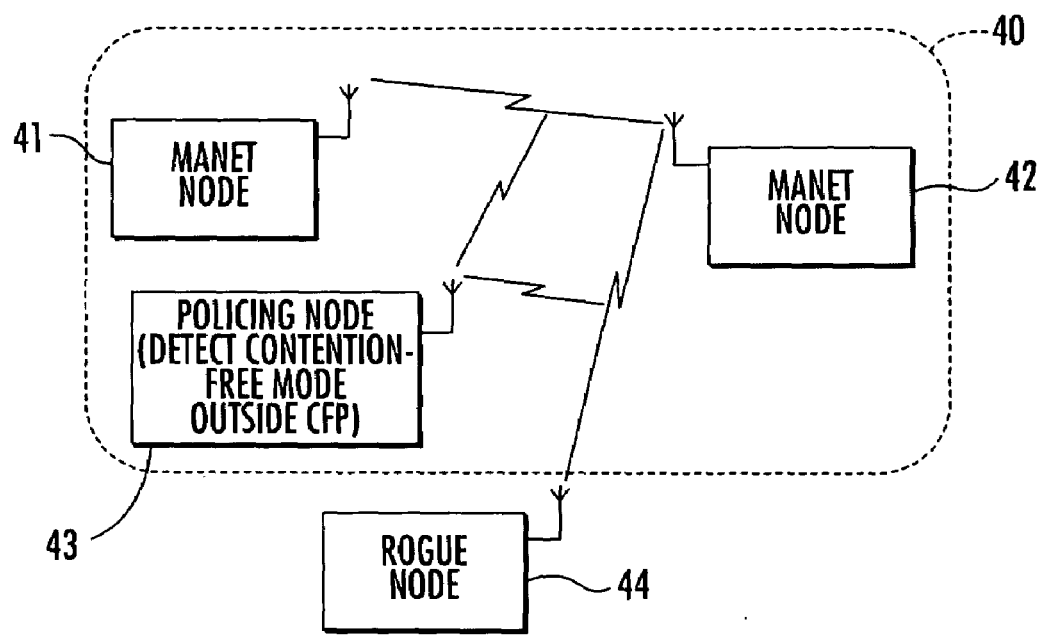
FIGS. 4 and 5 are schematic block diagrams of further alternate embodiments of the MANET of FIG. 1 for providing intrusion detection based upon contention-free mode operation outside of a contention-free period (CFP) and based upon contention mode operation during a CFP, respectively.

In accordance with a another embodiment of the MANET 40 illustrated in FIG. 4, the nodes 41, 42 may operate in contention or contention-free modes. That is, in a contention mode all network nodes are required to contend for access to the particular channel being used for each packet of data that is transmitted. During a contention-free period (CFP), channel usage is controlled by a designated control node, which thus eliminates the need for nodes to contend for channel access. In the case of MANETs having nodes arranged in groups or clusters, a cluster leader node may designate when a CFP is to be implemented, for example, as will be appreciated by those of skill in the art.

Thus, the policing node 43 may advantageously detect intrusions into the MANET 40 by monitoring transmissions among the nodes 41, 42 to detect contention-free mode operation outside of a CFP. As such, an intrusion alert may be generated by the policing node 43 based upon such detection. In other words, detection of a node operating in contention-free mode outside of a CFP indicates that this node is not an authorized node, as all authorized nodes will be informed by the designated control node when a CFP has been instituted.

Figure 5:
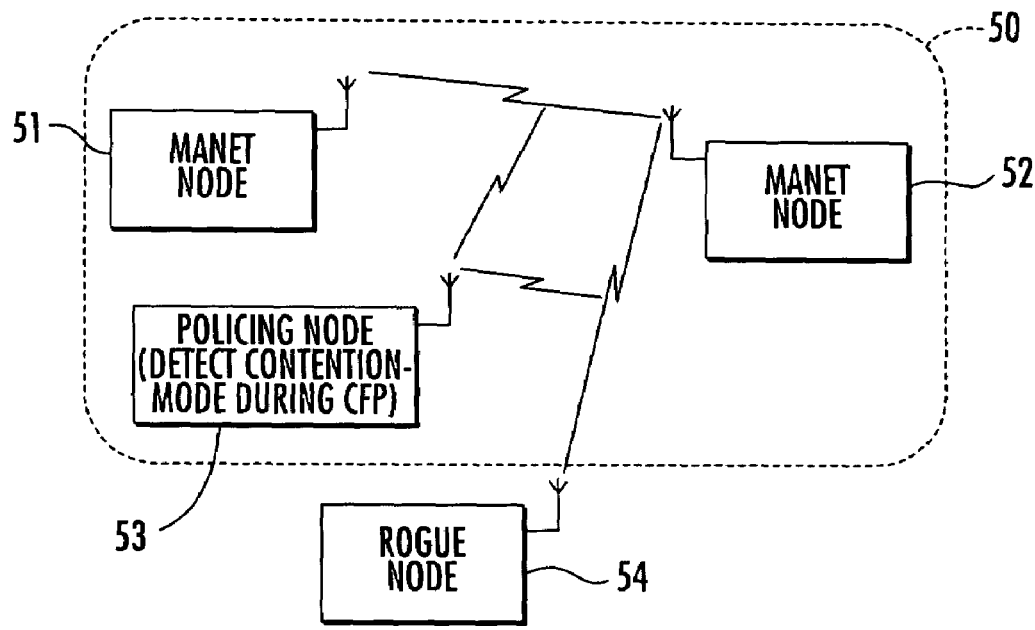

Of course, this would also be the case when contention mode operation is detected during a CFP, and such embodiment is illustratively shown in FIG. 5. It will be appreciated by those skilled in the art that either one or both of the above CFP intrusion detection approaches may be implemented in a given application.

Figure 6:
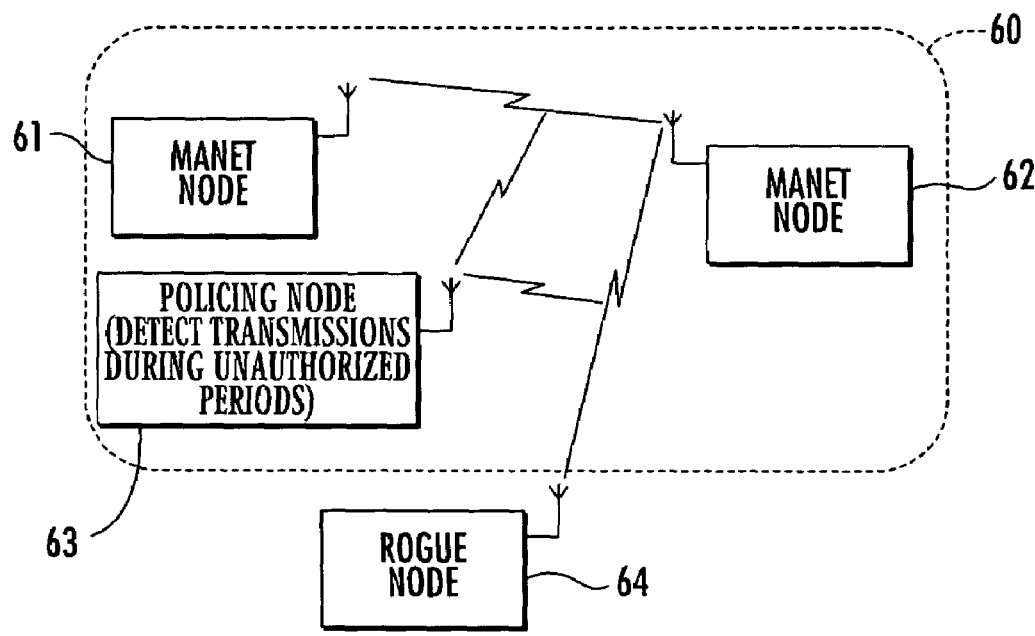
FIG. 6 is a schematic block diagram of another alternate embodiment of the MANET of FIG. 1 for providing intrusion detection based upon transmissions occurring during an unauthorized period.

Referring now to FIG. 6, another embodiment of MANET 60 is now described. Here, the policing node 63 detects intrusions into the MANET 60 by monitoring transmissions among the nodes 61, 62 to detect transmissions during an unauthorized period. That is, the MANET 60 may be implemented such that no users are allowed to access the network during specified hours (e.g., between midnight and 6:00 AM). Thus, upon detecting transmissions within this unauthorized period, the policing node 63 may advantageously generate an intrusion alert.

Figure 7:
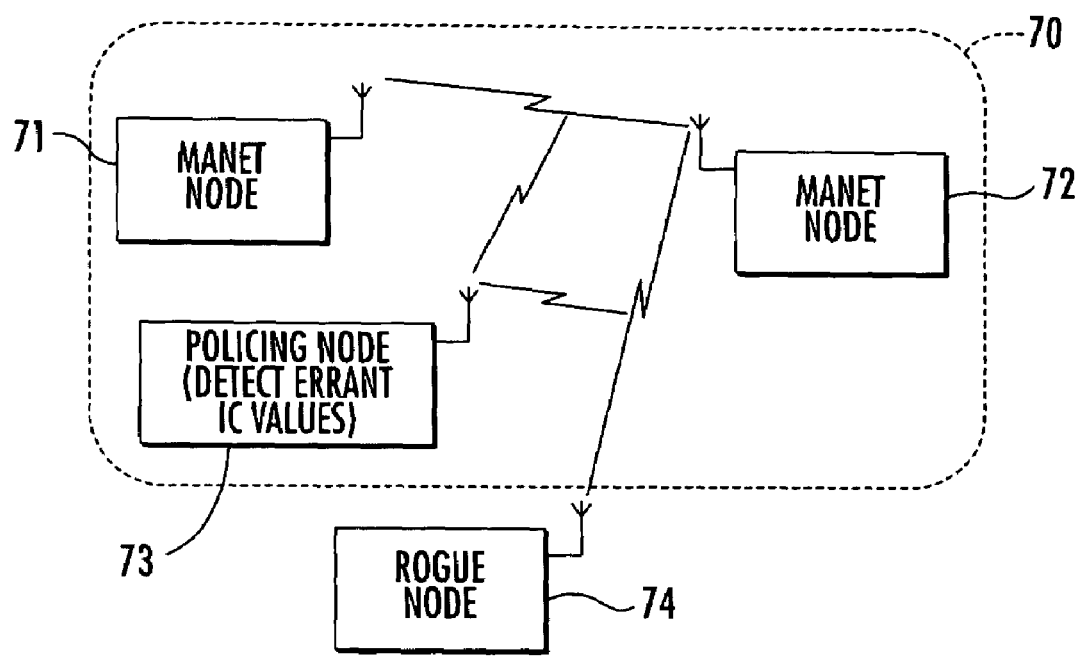
FIG. 7 is a schematic block diagram of still another alternate embodiment of the MANET of FIG. 1 for providing intrusion detection based upon detecting integrity check values which do not correspond with their respective data packets.

Turning now additionally to FIG. 7, still another embodiment of the MANET 70 is now described. In this embodiment, the various nodes 71, 72 generate integrity check values for data sent therefrom. These integrity check values are then verified by the receiving node to ensure that the integrity of the originally transmitted message data has not been compromised. By way of example, the integrity check value may be generated by processing the message data with an algorithm to provide a value to be included in the message text. This value may then be verified by a receiving node using the algorithm and the data received.

Thus, the policing node 73 detects intrusions into the MANET 70 by monitoring transmissions among the nodes 71, 72 to detect integrity check values which do not correspond with their respective data packets. That is, if an incorrect data encryption key is used to generate the message ciphertext, or if the message has been tampered with by the rouge node 84, the integrity check value will most likely be corrupted. As such, the policing node 73 may generate an intrusion alert when such errant integrity check values are detected, as will be appreciated by those of skill in the art.

Figure 8:
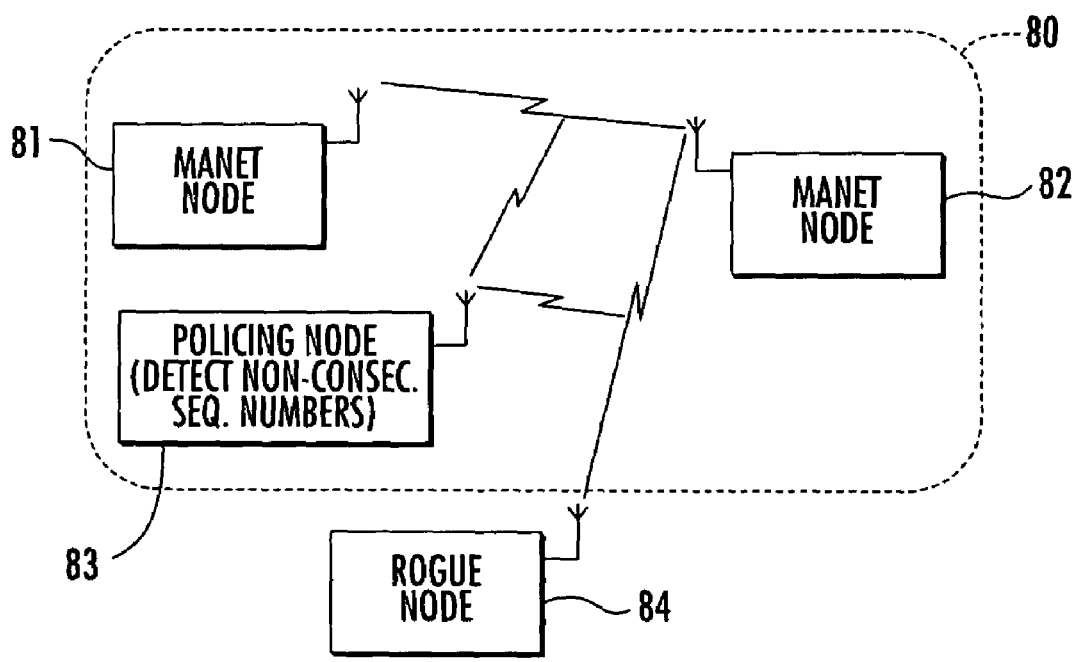
FIG. 8 is a schematic block diagram of yet another alternate embodiment of the MANET of FIG. 1 for providing intrusion detection based upon detecting usage of non-consecutive MAC sequence numbers by a node.

Still another MANET 80 in accordance with the invention is now described with reference to FIG. 8. Typically, when the above-noted OSI network model is used, a respective MAC sequence number is generated and sent with each data packet from the nodes 81, 82. That is, with each successive data packet the MAC sequence number is incremented, and thus each packet has a unique MAC sequence number associated therewith. As such, the policing node 83 may detect intrusions into the MANET 80 by monitoring transmissions among the nodes 81, 82 to detect usage of non-consecutive MAC sequence numbers by a node, and generate an intrusion alert based thereon.

Figure 9:
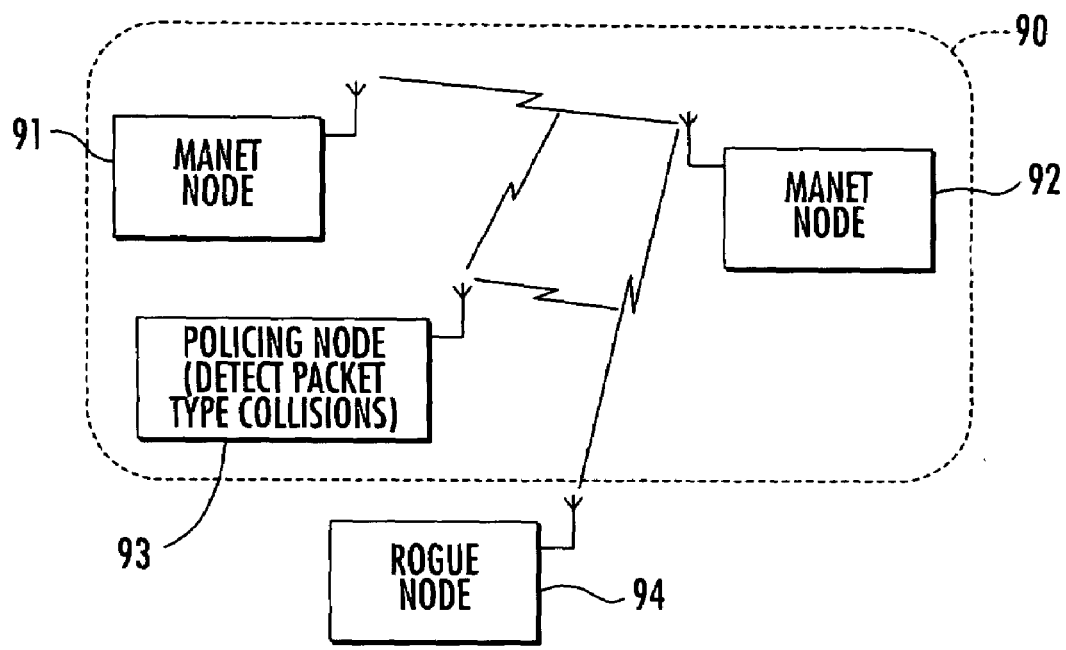
FIG. 9 is a schematic block diagram of another alternate embodiment of the MANET of FIG. 1 for providing intrusion detection based upon detecting collisions of packets having a predetermined packet type.

Turning now additionally to FIG. 9, another embodiment of the MANET 90 is illustrated in which the policing node 93 detects intrusions into the network by monitoring transmissions among the nodes 91, 92 to detect collisions of packets having a predetermined packet type. In particular, the predetermined packet type may include management frame packets (e.g., authentication, association, and beacon packets), control frame packets (e.g., RTS and CTS packets), and/or data frame packets. The policing node 93 may thus generate an intrusion alert based upon detecting a threshold number of collisions of the predetermined packet type.

As used herein, "collisions" is meant to include simultaneous transmission of packets as well as transmissions within a certain time of one another. That is, if a certain type of packet is supposed to have a time delay between transmissions, (e.g., a few seconds, etc.), if two such packet types are transmitted too close together (i.e., with less than the requisite delay time between them), this would be considered a collision. By way of example, the threshold number of collisions may be greater than about three, for example, although other thresholds may be used as well. Moreover, the threshold number may be based upon the particular packet type in question, i.e., the threshold number may be different for different packet types.

Additionally, the threshold number may be based upon a percentage of a total number of monitored packets having the predetermined packet type. For example, if a certain percentage (e.g., greater than about 10%) of packets transmitted during a period (e.g., one hour) are involved in collisions, then the intrusion alert may be generated. Alternatively, if a certain percentage of packets out of a total number of packets monitored (e.g., 3 out of 10) are involved in collisions, then the intrusion alert may be generated. Of course, other suitable threshold numbers and methods for establishing the same may also be used.

Figure 10:
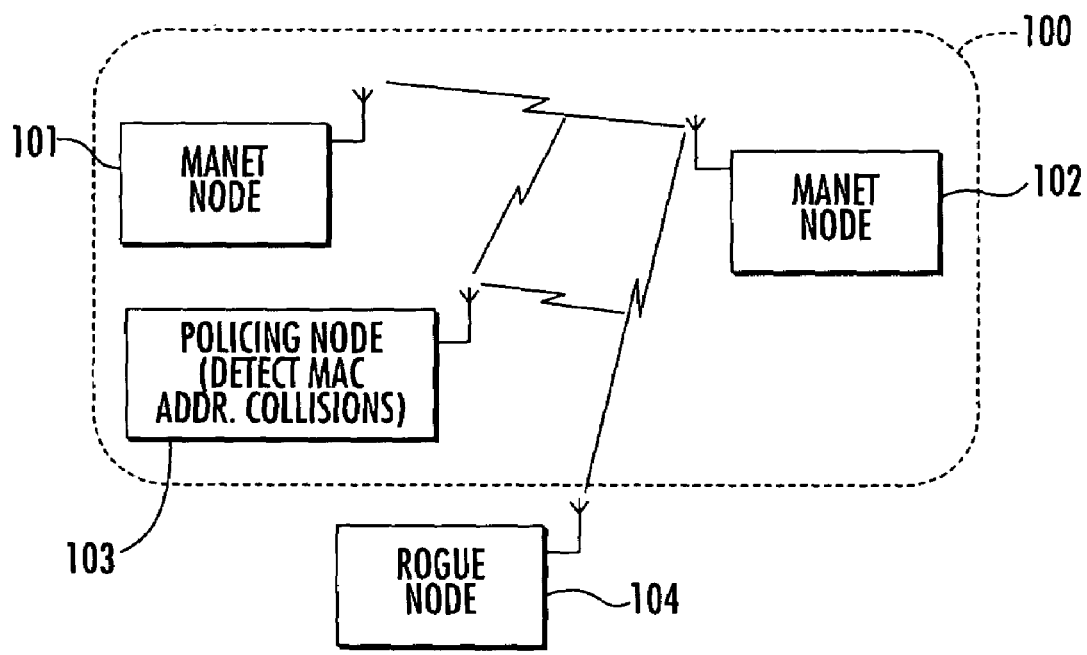
FIG. 10 is a schematic block diagram of yet another alternate embodiment of the MANET of FIG. 1 for providing intrusion detection based upon detecting collisions of a same MAC address.

Referring now to FIG. 10, another embodiment of the MANET 100 is described in which the policing node 103 detects intrusions into the network by monitoring transmissions among the nodes 101, 102 to detect collisions of a same MAC address. That is, if multiple terminals lay claim to the same MAC address simultaneously or relatively closely to one another, then either an error has occurred or one of the nodes is a rouge node 104. As such, the policing node 103 generates an intrusion alert based upon detecting a threshold number of such collisions, e.g., greater than about three. Here again, other threshold numbers may also be used, and the threshold number may also be based upon a percentage, as previously discussed above.

An intrusion detection method aspect of the invention for the MANET 10 will now be described with reference to FIG. 11. Beginning at Block 110, the method includes transmitting data between the plurality of nodes 11, 12 using the MAC layer, as previously noted above, at Block 111. The transmissions among the nodes 11, 12 are monitored to detect FCS errors from one of the MAC addresses, at Block 112. If a number of FCS errors for the MAC address exceeds a threshold, at Block 113, an intrusion alert is generated based thereon, at Block 114, thus ending the method (Block 115). Otherwise, the transmissions will continue to be monitored, as illustratively shown.

In accordance with a first alternate method aspect of the invention now described with reference to FIG. 12, the method begins (Block 120) with transmitting data between the nodes 21, 22, at Block 121, and monitoring transmissions to detect failed attempts to authenticate MAC addresses, at Block 122, as previously noted above. If a number of failed attempts to authenticate a MAC address is detected, at Block 123, then an intrusion is generated, at Block 124, thus concluding the method (Block 125). Otherwise, the intrusion monitoring may continue, as illustratively shown.

A second alternate method aspect of the invention will now be described with reference to FIG. 13. The method begins (Block 130) with transmitting RTS and CTS packets between the nodes 31, 32 and then transmitting data, at Block 131. The RTS and CTS packets transmitted between the nodes 31, 32 are monitored to detect an illegal NAV value therein, at Block 132, as previously described above. If an illegal NAV value is detected, at Block 133, an intrusion alert is generated based thereon, at Block 134, thus concluding the method (Block 135). Otherwise, the intrusion monitoring may continue, as illustratively shown.

Turning now to FIG. 14, a third alternate method aspect of the invention is now described. The method begins (Block 140) with transmitting data between the nodes 41, 42, at Block 141, and monitoring transmissions to detect contention-free mode operation outside of a CFP, at Block 142, as previously described above. If such operation is detected outside a CFP, at Block 143, an intrusion alert is generated based thereon, at Block 144, thus concluding the method (Block 145). Otherwise, the intrusion monitoring may continue, as illustratively shown. The opposite case in which transmissions are monitored for contention mode operation during CFPs is illustratively shown in FIG. 15 at Blocks 150–155. Here again, both of these methods could be used in a single embodiment, though this need not always be the case.

A fourth method aspect of the invention will now be described with reference to FIG. 16. The method begins (Block 160) with transmitting data between the nodes 61, 62, at Block 161, and monitoring to detect transmissions during an unauthorized period, at Block 162, as previously described above. If transmissions are detected during an unauthorized period, at Block 163, an intrusion alert is generated based thereon, at Block 164 thus concluding the method (Block 165). Otherwise, the intrusion monitoring may continue, as illustratively shown.

Yet another intrusion detection method aspect of the invention will now be described with reference to FIG. 17. The method begins (Block 170) with transmitting data between the nodes 71, 72, at Block 171, and monitoring transmissions 172 to detect integrity check values which do not correspond with their respective data packets, as previously described above. If this is the case, an intrusion alert is generated, at Block 173, thus ending the method (Block 175). Otherwise, the intrusion monitoring may continue, as illustratively shown.

Turning now to FIG. 18, still another method aspect of the invention is described. The method begins (Block 180) with transmitting data between the nodes 81, 82, at Block 181. Thus, the method may also include monitoring transmissions to detect usage of non-consecutive MAC sequence numbers by a node, at Block 182, as previously described above. If such usage is detected, at Block 183, an intrusion alert is generated, at Block 184, thus ending the method (Block 185). Otherwise, the intrusion monitoring may continue, as illustratively shown.

Figure 19:
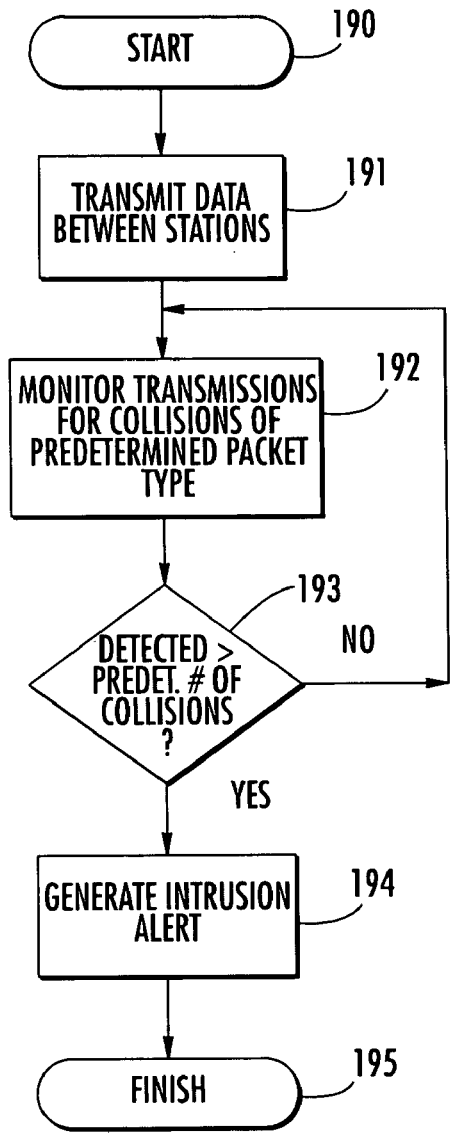
FIG. 19 is a flow diagram illustrating an intrusion detection method in accordance with the present invention based upon detecting collisions of packets having a predetermined packet type.

Referring additionally to FIG. 19, another method aspect of the invention begins (Block 190) with transmitting data packets between the nodes 91, 92, at Block 201, and monitoring transmissions to detect collisions of packets having a predetermined packet type, as noted above, at Block 192. If a threshold number of collisions of packets having the predetermined packet type are detected, at Block 193, then an intrusion alert is generated, at Block 194, ending the method (Block 195). Otherwise, the intrusion monitoring may continue, as illustratively shown.

Figure 20:
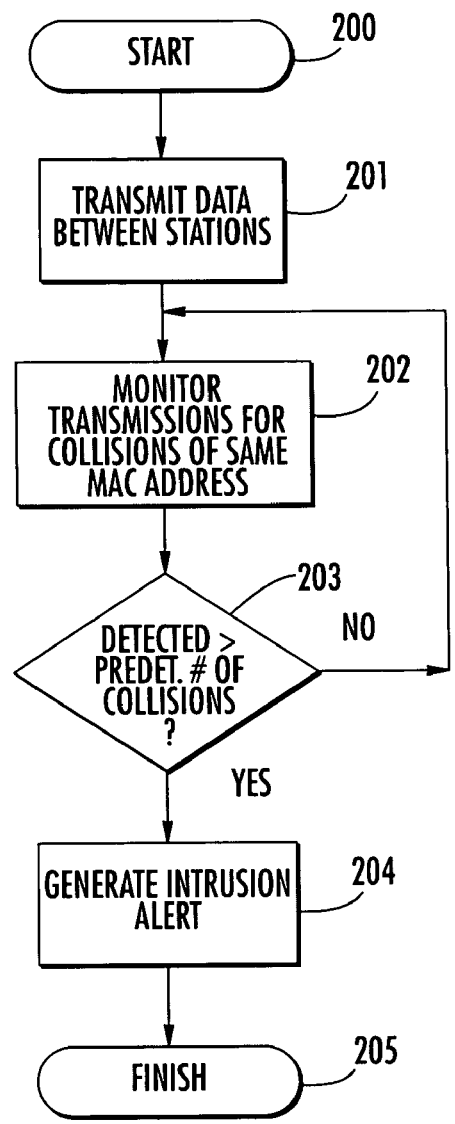
FIG. 20 is a flow diagram illustrating an intrusion detection method in accordance with the present invention based upon detecting collisions of a same MAC address.

Another intrusion detection method aspect of the invention will now be described with respect to FIG. 20. The method begins (Block 200) with transmitting data between the nodes 101, 102, and monitoring transmissions to detect collisions of a same MAC address, at Block 202, as previously described above. If a threshold number of collisions of a same MAC address are detected, at Block 203, an intrusion alert is generated, at Block 204, thus ending the method (Block 205). Otherwise, the intrusion monitoring may continue, as illustratively shown.

Figure 21:
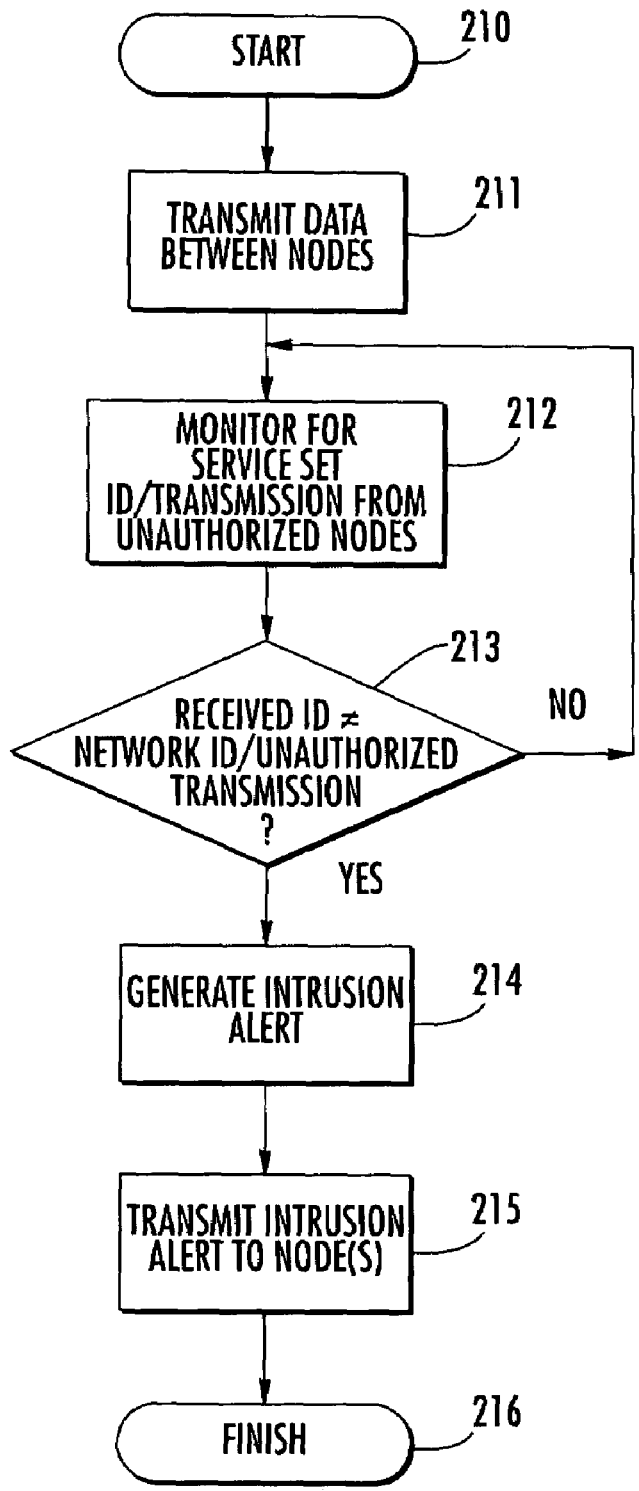
FIG. 21 is a flow chart illustrating additional method aspects of the invention for intrusion detection.

Further intrusion detection aspects of the invention will now be described with reference to FIG. 21. In accordance with the invention, a network or service set identification may be associated with the MANET 10, or smaller subsets (e.g., groups/clusters) thereof. As illustratively shown, beginning at Block 210, data may be transmitted between the nodes 11, 12, at Block 211, and the service set IDs transmitted therewith to identify authorized nodes of the MANET 10. As such, transmissions among the plurality of nodes 11, 12 may be monitored to detect service set IDs associated therewith and/or transmissions over a designated network channel not originating from an authorized node, at Block 212.

As such, if a service set ID that is different from an authorized service set ID of the MANET 10 and/or transmission from an unauthorized node on a network channel is detected, at Block 213, an intrusion alert may be generated based thereon, at Block 214. Moreover, the intrusion alert may advantageously be transmitted to one or more nodes in the network, as previously described above, or to another source, at Block 215. Otherwise, the intrusion monitoring may continue, as illustratively shown.

It will be understood by those skilled in the art that the above described method aspects may all be implemented in one or more of the MANETs described above. Also, additional method aspects of the invention will be apparent to those of skill in the art based upon the above description and will therefore not be discussed further herein.

It will also be appreciated that the above-described invention may be implemented in several ways. For example, the policing node 13 could be implemented in one or more separate, dedicated devices that are not already part of the MANET 10. Alternately, the invention may be implemented in software to be installed on one or more existing nodes in a MANET where intrusion detection is desired.

Further, many of the above-described aspects of the present invention may advantageously be used for detecting network intrusion even when a rogue node has an authorized network or MAC ID (e.g., contention-free operation outside a CFP, transmission during an unauthorized period, etc.) Moreover, one or more of the above aspects may advantageously be used in a given application to provide a desired level of intrusion detection. A further advantage of the invention is that it may be used to supplement existing intrusion detection systems, particularly those that focus on intrusion in the upper OSI network layers.

Additional features of the invention may be found in the co-pending application entitled MOBILE AD-HOC NETWORK WITH INTRUSION DETECTION FEATURES AND RELATED METHODS, attorney docket no. GCSD-1331 (51289), the entire disclosure of which is hereby incorporated herein by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile ad-hoc network (MANET) comprising:
   a plurality of nodes for transmitting data therebetween using a media access layer (MAC), each of said nodes having a respective MAC address associated therewith; and
   a policing node for detecting intrusions into the MANET by
      monitoring transmissions among said plurality of nodes to detect frame check sequence (FCS) errors from a MAC address; and
      generating an intrusion alert based upon detecting a number of FCS errors for the MAC address exceeding a threshold.

2. The MANET of claim 1 wherein said policing node further detects intrusions into the MANET by:
   monitoring transmissions among said plurality of nodes to detect failed attempts to authenticate MAC addresses; and
   generating an intrusion alert based upon detecting a number of failed attempts to authenticate a MAC address.

3. The MANET of claim 2 wherein said policing node generates an intrusion alert based upon detecting the number of failed attempts to authenticate the MAC address within a predetermined period.

4. The MANET of claim 1 wherein said plurality of nodes transmit request to send (RTS) and clear to send (CTS) packets therebetween prior to transmitting data, the RTS and CTS packets comprising a network allocation vector (NAV) value indicating a time duration reserved for transmitting the data; and wherein said policing node further detects intrusions into the MANET by:
   monitoring RTS and CTS packets transmitted among said plurality of nodes to detect an illegal NAV value therein; and
   generating an intrusion alert based upon the detected illegal NAV value.

5. The MANET of claim 1 wherein said plurality of nodes intermittently operate in a contention-free mode during contention-free periods (CFPs) and in a contention mode outside CFPs; and wherein said policing node further detects intrusions into the MANET by:
   monitoring transmissions among said plurality of nodes to detect contention-free mode operation outside of a CFP; and
   generating an intrusion alert based upon detecting contention-free mode operation outside a CFP.

6. The MANET of claim 1 wherein said plurality of nodes intermittently operate in a contention-free mode during contention-free periods (CFPs) and in a contention mode outside CFPs; and wherein said policing node further detects intrusions into the MANET by:
   monitoring transmissions among said plurality of nodes to detect contention mode operation during a CFP; and
   generating an intrusion alert based upon detecting contention mode operation outside a CFP.

7. The MANET of claim 1 wherein the MANET has at least one service set identification (ID) associated therewith; and wherein said policing node further detects intrusions into the MANET by:
   monitoring transmissions among said plurality of nodes to detect service set IDs associated therewith; and
   generating an intrusion alert based upon one of the detected service set IDs being different than the at least one service set ID of the MANET.

8. The MANET of claim 1 wherein said plurality of nodes transmit data over at least one channel; and wherein said policing node further detects transmissions over the at least one channel not originating from one of the plurality of nodes and generates an intrusion alert based thereon.

9. The MANET of claim 1 wherein said policing node further transmits an intrusion alert to at least one of said plurality of nodes.

10. A mobile ad-hoc network (MANET) comprising:
    a plurality of nodes for transmitting data therebetween using a media access layer (MAC), each of said nodes having a respective MAC address associated therewith; and
    a policing node for detecting intrusions into the MANET by
       monitoring transmissions among said plurality of nodes to detect failed attempts to authenticate MAC addresses; and
       generating an intrusion alert based upon detecting a number of failed attempts to authenticate a MAC address.

11. The MANET of claim 10 wherein said policing node generates an intrusion alert based upon detecting the number of failed attempts to authenticate the MAC address within a predetermined period.

12. The MANET of claim 10 wherein said plurality of nodes transmit request to send (RTS) and clear to send (CTS) packets therebetween prior to transmitting data, the RTS and CTS packets comprising a network allocation vector (NAV) value indicating a time duration reserved for transmitting the data; and wherein said policing node further detects intrusions into the MANET by:
    monitoring RTS and CTS packets transmitted among said plurality of nodes to detect an illegal NAV value therein; and
    generating an intrusion alert based upon the detected illegal NAV value.

13. The MANET of claim 10 wherein said plurality of nodes intermittently operate in a contention-free mode during contention-free periods (CFPs) and in a contention mode outside CFPs; and wherein said policing node further detects intrusions into the MANET by:
    monitoring transmissions among said plurality of nodes to detect contention-free mode operation outside of a CFP; and
    generating an intrusion alert based upon detecting contention-free mode operation outside a CFP.

14. The MANET of claim 10 wherein said plurality of nodes intermittently operate in a contention-free mode during contention-free periods (CFPs) and in a contention mode outside CFPs; and wherein said policing node further detects intrusions into the MANET by:

monitoring transmissions among said plurality of nodes to detect contention mode operation during a CFP; and generating an intrusion alert based upon detecting contention mode operation during a CFP.

15. The MANET of claim 10 wherein the MANET has at least one service set identification (ID) associated therewith; and wherein said policing node further detects intrusions into the MANET by:

monitoring transmissions among said plurality of nodes to detect service set IDs associated therewith; and generating an intrusion alert based upon one of the detected service set IDs being different than the at least one service set ID of the MANET.

16. The MANET of claim 10 wherein said plurality of nodes transmit data over at least one channel; and wherein said policing node further detects transmissions over the at least one channel not originating from one of the plurality of nodes and generates an intrusion alert based thereon.

17. The MANET of claim 10 wherein said policing node further transmits an intrusion alert to at least one of said plurality of nodes.

18. A mobile ad-hoc network (MANET) comprising:

a plurality of nodes for transmitting data therebetween;

said plurality of nodes transmitting request to send (RTS) and clear to send (CTS) packets therebetween prior to transmitting data, the RTS and CTS packets comprising a network allocation vector (NAV) value indicating a time duration reserved for transmitting the data; and a policing node for detecting intrusions into the MANET by monitoring RTS and CTS packets transmitted among said plurality of nodes to detect an illegal NAV value therein; and generating an intrusion alert based upon the detected illegal NAV value.

19. The MANET of claim 18 wherein said plurality of nodes intermittently operate in a contention-free mode during contention-free periods (CFPs) and in a contention mode outside CFPs; and wherein said policing node further detects intrusions into the MANET by:

monitoring transmissions among said plurality of nodes to detect contention-free mode operation outside of a CFP; and generating an intrusion alert based upon detecting contention-free mode operation outside a CFP.

20. The MANET of claim 18 wherein said plurality of nodes intermittently operate in a contention-free mode during contention-free periods (CFPs) and in a contention mode outside CFPs; and wherein said policing node further detects intrusions into the MANET by:

monitoring transmissions among said plurality of nodes to detect contention mode operation during a CFP; and generating an intrusion alert based upon detecting contention mode operation during a CFP.

21. The MANET of claim 18 wherein the MANET has at least one service set identification (ID) associated therewith; and wherein said policing node further detects intrusions into the MANET by:

monitoring transmissions among said plurality of nodes to detect service set IDs associated therewith; and generating an intrusion alert based upon one of the detected service set IDs being different than the at least one service set ID of the MANET.

22. The MANET of claim 18 wherein said plurality of nodes transmit over at least one channel; and wherein said policing node further detects transmissions over the at least one channel not originating from one of the plurality of nodes and generates an intrusion alert based thereon.

23. The MANET of claim 18 wherein said policing node further transmits an intrusion alert to at least one of said plurality of nodes.

24. A mobile ad-hoc network (MANET) comprising:

a plurality of nodes for transmitting data therebetween, said plurality of nodes intermittently operating in a contention-free mode during contention-free periods (CFPs) and in a contention mode outside CFPs; and a policing node for detecting intrusions into the MANET by monitoring transmissions among said plurality of nodes to detect contention-free mode operation outside of a CFP; and generating an intrusion alert based upon detecting contention-free mode operation outside a CFP.

25. The MANET of claim 24 wherein the MANET has at least one service set identification (ID) associated therewith; and wherein said policing node further detects intrusions into the MANET by:

monitoring transmissions among said plurality of nodes to detect service set IDs associated therewith; and generating an intrusion alert based upon one of the detected service set IDs being different than the at least one service set ID of the MANET.

26. The MANET of claim 24 wherein said plurality of nodes transmit over at least one channel; and wherein said policing node further detects transmissions over the at least one channel not originating from one of the plurality of nodes and generates an intrusion alert based thereon.

27. The MANET of claim 24 wherein said policing node further transmits an intrusion alert to at least one of said plurality of nodes.

28. A mobile ad-hoc network (MANET) comprising:

a plurality of nodes for transmitting data therebetween, said plurality of nodes intermittently operating in a contention-free mode during contention-free periods (CFPs) and in a contention mode outside CFPs; and a policing node for detecting intrusions into the MANET by monitoring transmissions among said plurality of nodes to detect contention mode operation during a CFP; and generating an intrusion alert based upon detecting contention mode operation during a CFP.

29. The MANET of claim 28 wherein the MANET has at least one service set identification (ID) associated therewith; and wherein said policing node further detects intrusions into the MANET by:

monitoring transmissions among said plurality of nodes to detect service set IDs associated therewith; and generating an intrusion alert based upon one of the detected service set IDs being different than the at least one service set ID of the MANET.

30. The MANET of claim 28 wherein said plurality of nodes transmit over at least one channel; and wherein said policing node further detects transmissions over the at least one channel not originating from one of the plurality of nodes and generates an intrusion alert based thereon.

31. The MANET of claim 28 wherein said policing node further transmits an intrusion alert to at least one of said plurality of nodes.

32. An intrusion detection method for a mobile ad-hoc network (MANET) comprising a plurality of nodes, the method comprising:

transmitting data between the plurality of nodes using a media access layer (MAC), each of the nodes having a respective MAC address associated therewith;
monitoring transmissions among the plurality of nodes to detect frame check sequence (FCS) errors from a MAC address; and
generating an intrusion alert based upon detecting a number of FCS errors for the MAC address exceeding a threshold.

33. The method of claim 32 further comprising:
monitoring transmissions among the plurality of nodes to detect failed attempts to authenticate MAC addresses; and
generating an intrusion alert based upon detecting a number of failed attempts to authenticate a MAC address.

34. The method of claim 33 wherein generating an intrusion alert based upon detecting a number of failed attempts to authenticate a MAC address comprises generating an intrusion alert based upon detecting the number of failed attempts to authenticate the MAC address within a predetermined period.

35. The method of claim 32 further comprising:
transmitting request to send (RTS) and clear to send (CTS) packets between the plurality of nodes prior to transmitting data, the RTS and CTS packets comprising a network allocation vector (NAV) value indicating a time duration reserved for transmitting the data;
monitoring the RTS and CTS packets sent between the plurality of nodes to detect an illegal NAV value therein; and
generating an intrusion alert based upon the detected illegal NAV value.

36. The method of claim 32 wherein the plurality of nodes intermittently operate in a contention-free mode during contention-free periods (CFPs) and in a contention mode outside CFPs; and further comprising:
monitoring transmissions among the plurality of nodes to detect contention-free mode operation outside of a CFP; and
generating an intrusion alert based upon detecting contention-free mode operation outside a CFP period.

37. The method of claim 32 wherein the plurality of nodes intermittently operate in a contention-free mode during contention-free periods (CFPs) and in a contention mode outside CFPs; and further comprising:
monitoring transmissions among the plurality of nodes to detect contention mode operation during a CFP; and
generating an intrusion alert based upon detecting contention mode operation during a CFP period.

38. The method of claim 32 wherein the MANET has at least one service set identification (ID) associated therewith; and further comprising:
monitoring transmissions among the plurality of nodes to detect service set IDs associated therewith; and
generating an intrusion alert based upon one of the detected service set IDs being different than the at least one service set ID of the MANET.

39. The method of claim 32 wherein transmitting data comprises transmitting data over at least one channel; and further comprising detecting transmissions over the at least one channel not originating from one of the plurality of nodes and generating an intrusion alert based thereon.

40. The method of claim 32 further comprising transmitting the intrusion alert to at least one of the plurality of nodes.

41. An intrusion detection method for a mobile ad-hoc network (MANET) comprising a plurality of nodes, the method comprising:
transmitting data between the plurality of nodes using a media access layer (MAC), each of the nodes having a respective MAC address associated therewith;
monitoring transmissions among the plurality of nodes to detect failed attempts to authenticate MAC addresses; and
generating an intrusion alert based upon detecting a number of failed attempts to authenticate a MAC address.

42. The method of claim 41 wherein generating an intrusion alert based upon detecting a number of failed attempts to authenticate a MAC address comprises generating an intrusion alert based upon detecting the number of failed attempts to authenticate the MAC address within a predetermined period.

43. The method of claim 41 further comprising:
transmitting request to send (RTS) and clear to send (CTS) packets between the plurality of nodes prior to transmitting data, the RTS and CTS packets comprising a network allocation vector (NAV) value indicating a time duration reserved for transmitting the data;
monitoring the RTS and CTS packets sent between the plurality of nodes to detect an illegal NAV value therein; and
generating an intrusion alert based upon the detected illegal NAV value.

44. The method of claim 41 wherein the plurality of nodes intermittently operate in a contention-free mode during contention-free periods (CFPs) and in a contention mode outside CFPs; and further comprising:
monitoring transmissions among the plurality of nodes to detect contention-free mode operation outside of a CFP; and
generating an intrusion alert based upon detecting contention-free mode operation outside a CFP period.

45. The method of claim 41 wherein the plurality of nodes intermittently operate in a contention-free mode during contention-free periods (CFPs) and in a contention mode outside CFPs; and further comprising:
monitoring transmissions among the plurality of nodes to detect contention mode operation during a CFP; and
generating an intrusion alert based upon detecting contention mode operation during a CFP period.

46. The method of claim 41 wherein the MANET has at least one service set identification (ID) associated therewith; and further comprising:
monitoring transmissions among the plurality of nodes to detect service set IDs associated therewith; and
generating an intrusion alert based upon one of the detected service set IDs being different than the at least one service set ID of the MANET.

47. The method of claim 41 wherein transmitting data comprises transmitting data over at least one channel; and further comprising detecting transmissions over the at least one channel not originating from one of the plurality of nodes and generating an intrusion alert based thereon.

48. The method of claim 41 further comprising transmitting the intrusion alert to at least one of the plurality of nodes.

49. An intrusion detection method for a mobile ad-hoc network (MANET) comprising a plurality of nodes, the method comprising:
transmitting request to send (RTS) and clear to send (CTS) packets between the plurality of nodes, the RTS and CTS packets comprising a network allocation vector (NAV) value indicating a time duration reserved for transmitting data between the plurality of nodes;

transmitting data between the plurality of nodes;

monitoring the RTS and CTS packets sent between the plurality of nodes to detect an illegal NAV value therein; and generating an intrusion alert based upon the detected illegal NAV value.

50. The method of claim 49 wherein the plurality of nodes intermittently operate in a contention-free mode during contention-free periods (CFPs) and in a contention mode outside CFPs; and further comprising:

monitoring transmissions among the plurality of nodes to detect contention-free mode operation outside of a CFP; and generating an intrusion alert based upon detecting contention-free mode operation outside a CFP period.

51. The method of claim 49 wherein the plurality of nodes intermittently operate in a contention-free mode during contention-free periods (CFPs) and in a contention mode outside CFPs; and further comprising:

monitoring transmissions among the plurality of nodes to detect contention mode operation during a CFP; and generating an intrusion alert based upon detecting contention mode operation during a CFP period.

52. The method of claim 49 wherein the MANET has at least one service set identification (ID) associated therewith; and further comprising:

monitoring transmissions among the plurality of nodes to detect service set IDs associated therewith; and generating an intrusion alert based upon one of the detected service set IDs being different than the at least one service set ID of the MANET.

53. The method of claim 49 wherein transmitting data comprises transmitting data over at least one channel; and further comprising detecting transmissions over the at least one channel not originating from one of the plurality of nodes and generating an intrusion alert based thereon.

54. The method of claim 49 further comprising transmitting the intrusion alert to at least one of the plurality of nodes.

55. An intrusion detection method for a mobile ad-hoc network (MANET) comprising a plurality of nodes, the method comprising:

transmitting data between the plurality of nodes, the plurality of nodes intermittently operating in a contention-free mode during contention-free periods (CFPs) and in a contention mode outside CFPs;

monitoring transmissions among the plurality of nodes to detect contention-free mode operation outside of a CFP; and generating an intrusion alert based upon detecting contention-free mode operation outside a CFP period.

56. The method of claim 55 wherein the MANET has at least one service set identification (ID) associated therewith; and further comprising:

monitoring transmissions among the plurality of nodes to detect service set IDs associated therewith; and generating an intrusion alert based upon one of the detected service set IDs being different than the at least one service set ID of the MANET.

57. The method of claim 55 wherein transmitting data comprises transmitting data over at least one channel; and further comprising detecting transmissions over the at least one channel not originating from one of the plurality of nodes and generating an intrusion alert based thereon.

58. The method of claim 55 further comprising transmitting the intrusion alert to at least one of the plurality of nodes.

59. An intrusion detection method for a mobile ad-hoc network (MANET) comprising a plurality of nodes, the method comprising:

transmitting data between the plurality of nodes, the plurality of nodes intermittently operating in a contention-free mode during contention-free periods (CFPs) and in a contention mode outside CFPs;

monitoring transmissions among the plurality of nodes to detect contention mode operation during a CFP; and generating an intrusion alert based upon detecting contention mode operation during a CFP period.

60. The method of claim 59 wherein the MANET has at least one service set identification (ID) associated therewith; and further comprising:

monitoring transmissions among the plurality of nodes to detect service set IDs associated therewith; and generating an intrusion alert based upon one of the detected service set IDs being different than the at least one service set ID of the MANET.

61. The method of claim 59 wherein transmitting data comprises transmitting data over at least one channel; and further comprising detecting transmissions over the at least one channel not originating from one of the plurality of nodes and generating an intrusion alert based thereon.

62. The method of claim 59 further comprising transmitting the intrusion alert to at least one of the plurality of nodes.

* * * * *